Patented June 15, 1954

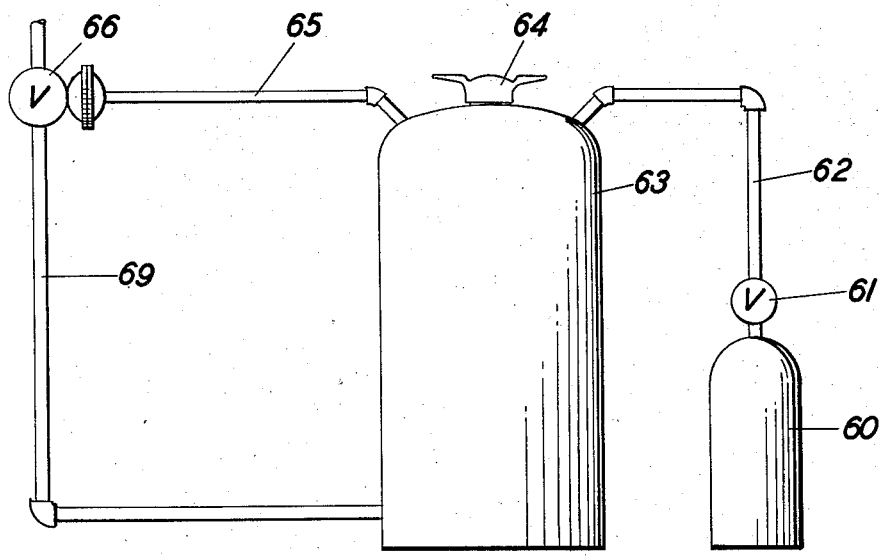
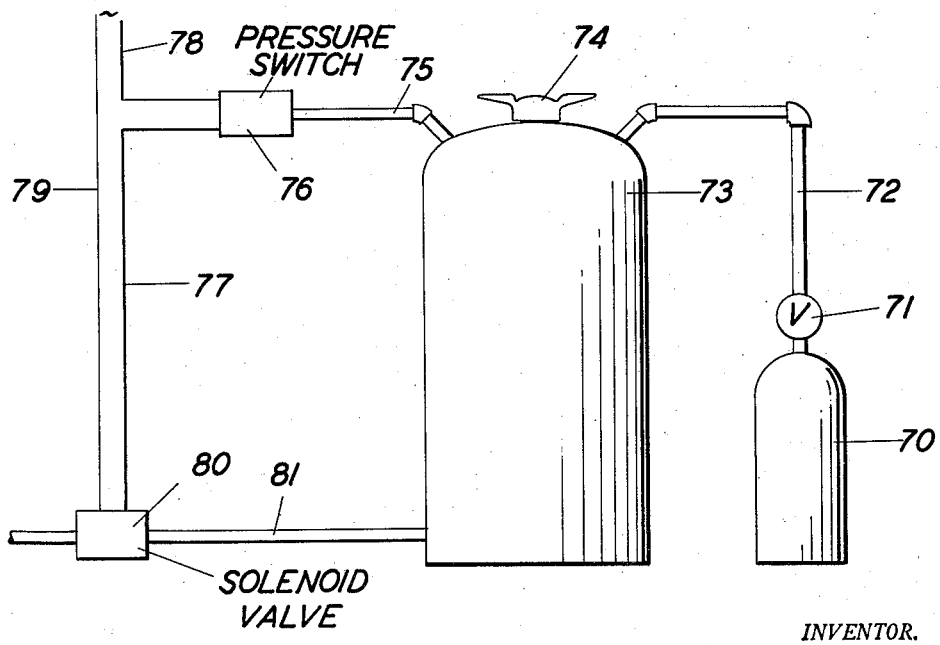

2,681,115

UNITED STATES PATENT OFFICE 2,681,115

APPARATUS FOR RELEASING FIRE-EXTINGUISHING DRY CHEMICAL

Arthur B. Guise, Marinette, Wis., assignor to Ansul Chemical Company, Marinette, Wis., a corporation of Wisconsin Application January 31, 1951, Serial No. 208,825

2 Claims. (Cl. 169—11)

This invention relates to an apparatus for controlling the release of dry chemical powder from fire-extinguishing apparatus to obtain greater fire-extinguishing effectiveness.

In gas pressure-type dry chemical powder fire-extinguishing equipment, the fluidizing and expellant gas is frequently stored separately and admitted to the chamber containing a dry chemical powder only when the apparatus is to be used. If the conduit leading from the dry chemical chamber is open at the time the gas is admitted to the dry chemical powder chamber, a considerable portion of the fluidizing and pressurizing gas is lost through this conduit, resulting in an undesirable ratio of dry chemical powder to expellant gas and an undesirably low rate of flow of dry chemical powder. By delaying the release of the dry chemical powder in fluidized form from the dry chemical powder chamber until the dry chemical powder has been fluidized and a predetermined pressure reached in the dry chemical powder chamber, a desirable ratio of dry chemical powder to expellant gas is obtained and an equally desirable rate of flow of dry chemical powder is maintained.

The proper control of the rate of flow of dry chemical powder is essential to the successful operation of dry chemical powder fire-extinguishing systems where the conduit from the dry chemical powder chamber leads to one or more open nozzles connected by properly designed piping to operate automatically in case of a fire. The flow of dry chemical from a dry chemical powder chamber without the necessary delay in release of the dry chemical powder until the pressure has reached a satisfactory predetermined point results in variations in the rate of flow with possible deleterious results on the fire-extinguishing effectiveness of such a system. The means provided by this invention permits the installation of automatically operated dry chemical powder piped systems which will furnish reliable fire protection. The same means can also be applied to manually operated equipment wherein either pipe lines with fixed nozzles or hose lines with manually operated nozzles are used. In all cases the use of this invention in dry chemical powder fire-extinguishing equipment will provide more reliable fire protection.

According to the present invention the dry chemical is fluidized and pressurized to a predetermined pressure in a closed chamber. The chamber is connected to a conduit for conveying the fluidized dry chemical therefrom. Delay in the release of the dry chemical from the dry chemical powder chamber is attained by using a normally closed automatically operated valve or other means, such as a bursting disc, to ensure that the pressure reaches the desired predetermined value before the dry chemical powder is released from the dry chemical powder chamber.

Further advantages and details of the invention will be apparent from the following specification and drawings, wherein Figure 1 is a diagrammatic representation of a fire-extinguishing apparatus provided with a pressure-responsive diaphragm operated valve to control the dry chemical supply conduit, and Figure 2 is a diagrammatic representation of a modified fire-extinguishing apparatus provided with a pressure-responsive solenoid operated valve to control the dry chemical supply conduit.

Figure 1 diagrammatically illustrates a dry chemical fire-extinguishing system comprising a source of gas pressure 60, controlled by valve 61, connected by line 62 to a dry chemical storage chamber 63. A supply of dry chemical such as disclosed in Patent 1,793,420, February 17, 1931, is placed in chamber 63 by opening closure 64 when desired. The upper portion of chamber 63 is connected to a conduit 65 provided with a pressure-responsive diaphragm valve 66 in the dry chemical supply conduit 69 suitably connected to chamber 63. When the gas pressure reaches a predetermined value in chamber 63, the diaphragm valve 66 will be automatically actuated to open supply line 69.

Other suitable valve controls may be utilized as shown, for example, in Figure 2, wherein a tank 70 supplies gas under pressure through valve 71 and conduit 72 to a dry chemical chamber 73 provided with a removable closure 74. Chamber 73 is connected at its upper portion by conduit 75 to a pressure-responsive switch 76 which actuates solenoid valve 80 in the dry chemical supply conduit 81 connected to chamber 73. Electric leads 77, 78 and 79 are suitably connected to the pressure switch and solenoid valve so that when the pressure in chamber 73 reaches a predetermined value, pressure switch 76 will be activated to operate the solenoid valve 80. The solenoid valve 80 may be of any suitable construction.

From the foregoing description it will be seen that the present invention provides an effective dry chemical fire-extinguishing apparatus which supplies a fluidized stream of dry chemical having a substantially constant predetermined ratio of dry chemical to expellant gas. The dry chemical is first fluidized in a closed chamber by supplying fluidizing gas thereto and additional gas under pressure is admitted to the chamber in such manner as to pressurize all portions of the chamber at substantially the same rate. The dry chemical chamber is connected to a dry chemical conduit which is normally closed by a pressure-responsive valve which is actuated to open position only when the pressure in the chamber reaches a predetermined pressure.

Numerous changes and modifications may be made in the details of the invention previously described which are intended to be included within the scope of the appended claims.

I claim:

1. Fire-extinguishing apparatus for releasing dry chemical powder which comprises a closed chamber for retaining dry chemical powder, means to admit gas under pressure to said closed chamber for fluidizing said dry chemical within said closed chamber and to increase the pressure within said closed chamber, and a conduit connected to said closed chamber for conveying said fluidized dry chemical therefrom, said conduit being normally closed by a valve, a pressure-responsive diaphragm in communication with said closed chamber, actuating means connecting said diaphragm and said valve, whereby said valve is opened when a predetermined pressure is attained in said chamber.

2. Fire-extinguishing apparatus for releasing dry chemical powder which comprises a closed chamber for retaining dry chemical powder, means to admit gas under pressure to said closed chamber for fluidizing said dry chemical within said closed chamber and to increase the pressure within said closed chamber, and a conduit connected to said closed chamber for conveying said fluidized dry chemical therefrom, said conduit being normally closed by a valve, electrical means to operate same, a pressure-responsive switch in communication with said closed chamber, electrical conductors connecting said switch with said electrically operated valve whereby said valve is opened when the pressure within said chamber attains a predetermined value.

References Cited in the file of this patent

UNITED STATES PATENTS

| Number | Name | Date |
|--------|------|------|
| 1,169,646 | Jaretzki | Jan. 25, 1913 |